United States Patent [19]

Komaki et al.

[11] Patent Number: 4,652,505
[45] Date of Patent: Mar. 24, 1987

[54] SEALED LEAD STORAGE BATTERY

[75] Inventors: Akio Komaki; Takumi Hayakawa; Tadashi Yoneda, all of Nabari; Asahiko Miura, Yamatotakada; Hironao Wada, Nabari; Satoshi Matsubayashi, Nabari; Arihiko Takemasa, Nabari, all of Japan

[73] Assignee: Shin-Kobe Machinery Co., Ltd., Tokyo, Japan

[21] Appl. No.: 716,253

[22] Filed: Mar. 26, 1985

[30] Foreign Application Priority Data

Mar. 29, 1984 [JP] Japan .............................. 59-45580[U]
Mar. 29, 1984 [JP] Japan .............................. 59-45581[U]
Mar. 30, 1984 [JP] Japan .............................. 59-64077
Mar. 30, 1984 [JP] Japan .............................. 59-64078

[51] Int. Cl.$^4$ ............................................. H01M 2/14
[52] U.S. Cl. .................................... 429/131; 429/136; 429/225
[58] Field of Search ............... 429/131, 132, 134, 135, 429/136, 141, 142, 144, 204, 225, 245, 248, 252

[56] References Cited

U.S. PATENT DOCUMENTS

| | | | |
|---|---|---|---|
| 442,391 | 12/1890 | Pumpelly | 429/132 |
| 1,405,627 | 2/1922 | Petrie | 429/132 |
| 1,486,430 | 3/1924 | Hansen | 429/132 |
| 1,905,319 | 4/1933 | Sturges | 429/132 |
| 2,176,173 | 10/1939 | Fuller et al. | 429/132 X |
| 2,484,787 | 10/1949 | Grant | 429/144 |
| 2,511,887 | 6/1950 | Vinal | 429/144 |
| 2,719,874 | 10/1955 | Chapman | 429/131 |
| 4,125,690 | 11/1978 | Bagshaw et al. | 429/245 X |

FOREIGN PATENT DOCUMENTS

| 272916 | 9/1928 | United Kingdom | 429/132 |
|---|---|---|---|
| 1124331 | 8/1968 | United Kingdom | 429/132 |

Primary Examiner—Anthony Skapars
Attorney, Agent, or Firm—Pearne, Gordon, McCoy & Granger

[57] ABSTRACT

This invention relates to an improvement on a sealed lead storage battery which comprises a case, positive and negative plates alternately disposed in a case, porous separators between the adjacent plates and electrolyte filled in the case so as to be retained at least in the porous separators.

The sealed lead storage battery of the invention further comprises additional electrolyte porous retainer means disposed in an unoccupied space in the case so as to have increased amount of electrolyte. The additional electrolyte retainer means may be disposed in at least one of an upper space over the plate group, a lower space below the plate group and side spaces beside the plate group. The additional electrolyte retainer means may be of glass fine fiber mat, glass and synthetic fine fiber mat or gel. It may be integrally formed with the porous separators. Preferably, the positive and negative plates may be so porous that the electrolyte is retained in them.

2 Claims, 13 Drawing Figures

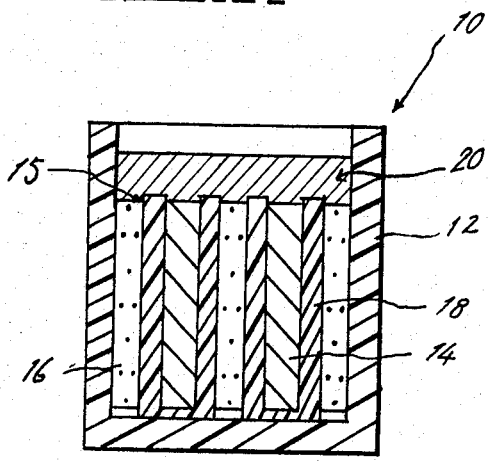
FIG_1_
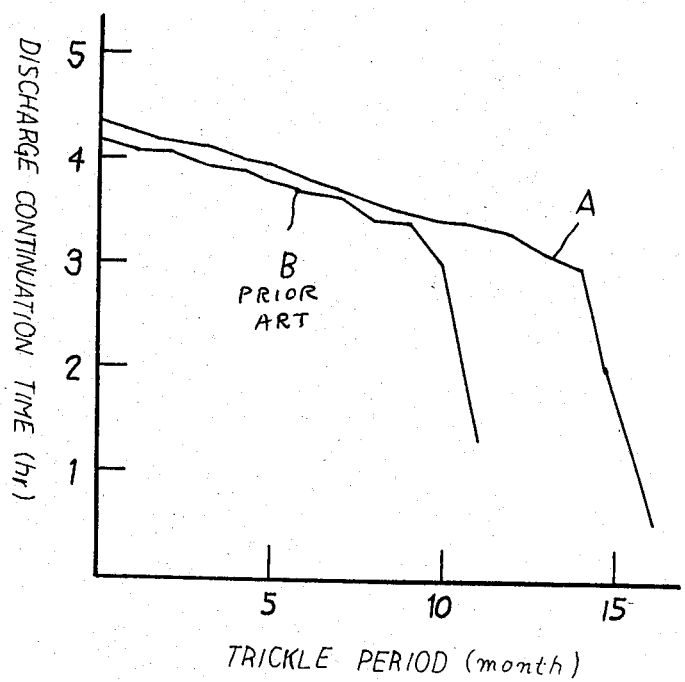
FIG_2_

U.S. Patent Mar. 24, 1987 Sheet 3 of 4 4,652,505
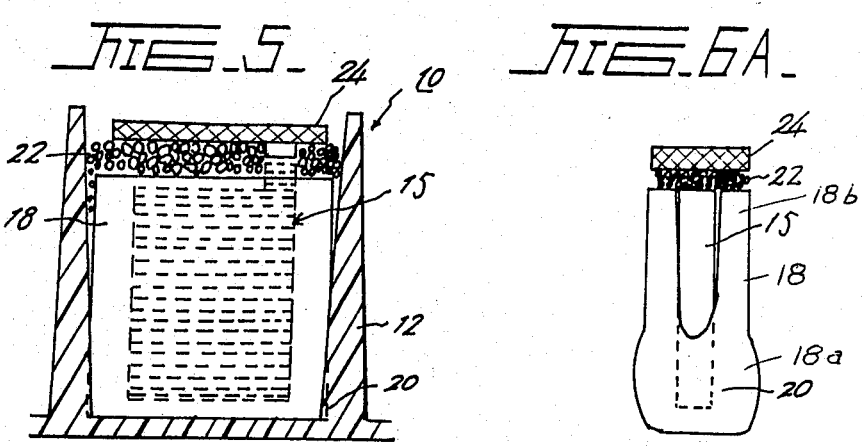
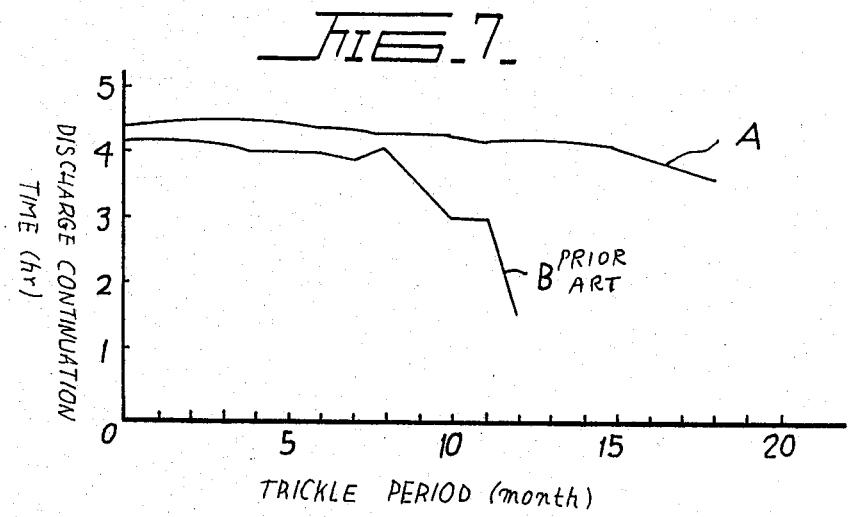
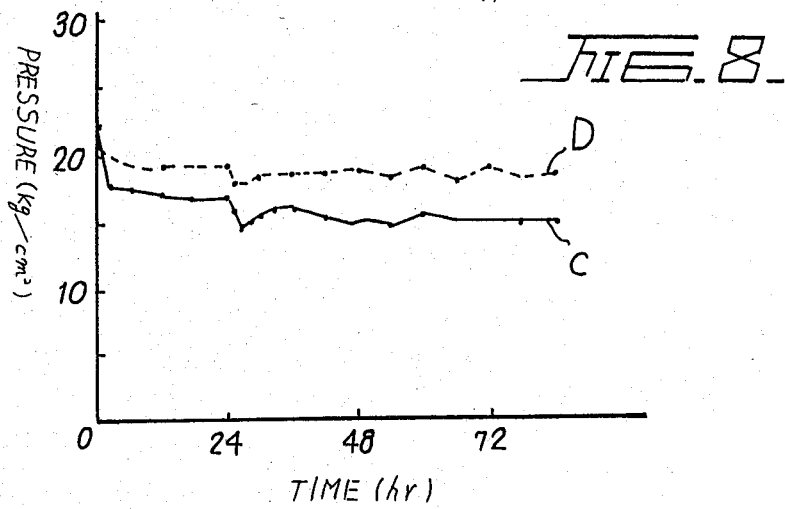

SEALED LEAD STORAGE BATTERY

BACKGROUND OF THE INVENTION

Of late, there has been developed a retainer type sealed lead storage battery which has no leakage of water and no need for supplemental water so as to have no maintenance. Such a sealed lead storage battery comprises porous separators between adjacent plates and electrolyte filled in the case so as to be retained at least in the porous separators. The porous separators may be formed of glass fine fiber mat, for example. In this sealed lead storage battery, it is considered that oxygen gases generated at positive plates are reduced at three interfaces of oxygen gases, lead of negative plates and electrolyte to be returned to water as expressed by the following formula:

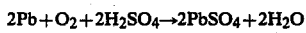

$$2Pb + O_2 + 2H_2SO_4 \rightarrow 2PbSO_4 + 2H_2O$$

When the battery is over-charged, the oxygen gases are absorbed at the negative plates where there occurs reduction of lead sulfate ($PbSO_4$). This prevents hydrogen gases from being generated, which enables the storage battery to be sealed.

However, this sealed lead storage battery consumes the remaining fluid electrolyte so that an amount of electrolyte is necessarily reduced. Thus, reduction of electrolyte on trickle charge causes the storage battery to have a shortened life.

In order to avoid such a drawback, it is required to increase an amount of electrolyte. However, it is also required that electrolyte has to be fixed without change in a volume of the whole storage battery for provision of compactness and no leakage of solution. Since the sealed lead storage battery has most electrolyte retained in glass fine fiber mats and porous active materials of the plates, the volume of the whole storage battery has to be essentially increased in order to retain more electrolyte.

Furthermore, a capacity of the sealed lead storage battery relies on closeness of the plates to the retainer. If the plates are poorly close to the retainer, then the plates cannot communicate with the electrolyte, which deteriorates the efficiency of the storage battery. This is caused by decrease in the capacity of discharge which is in turn caused by decrease in amount of solution due to generation of gases which is caused by decomposition of water on trickle of floating charge or due to evaporation of electrolyte on use at relatively high temperature.

In case the electrolyte is formed of gel mainly comprising powder of sodium sulfate, sulfic acid and silicon oxide, the storage battery is deteriorated by removing water out of the gel layer to generate isolated water, contracting the gel layer due to its hardness, separating the surfaces of the plates from the gel layer, preventing charging reaction with the plates and lowering the capacity of the storage battery, which provides a shortened life to the storage battery.

SUMMARY OF THE INVENTION

Accordingly, it is a principal object of the invention to provide a sealed lead storage battery adapted to have more electrolyte retained to provide an elongated life threreto.

It is another object of the invention to provide a sealed lead storage battery adapted to prevent plates from being poorly close to retainer to provide an elongated life thereto.

It is further object of the invention to provide a sealed lead storage battery adapted to prevent electrolyte from being gelled to improve a life of the storage battery.

In accordance with the present invention, there is provided a sealed lead storage battery comprising a case, positive and negative plates alternately disposed in the case, porous separators between the adjacent plates and electrolyte filled in the case so as to be retained at least in the porous separators characterized by further comprising additional electrolyte porous retainer means disposed in an unoccupied space in the case so as to have an increased amount of electrolyte.

BRIEF DESCRIPTION OF THE DRAWINGS

The above and other objects and features of the invention will be apparent from the description of the embodiments taken along with reference to the accompanying drawings in which;

FIG. 1 is a cross sectional view of a sealed lead storage battery constructed in accordance with one embodiment of the invention;

FIG. 2 illustrates a discharge continuation time of the lead storage batteries of FIG. 1 and the prior art relative to a trickle period;

FIG. 5 is a cros sectional view of a sealed lead storage battery constructed in accordance with further embodiment of the invention;

FIGS. 6A and 6B are side elevational and cross sectional views of a plate group enveloped by separators in the storage battery of FIG. 5;

FIG. 7 illustrates a discharge continuation time of the lead storage batteries of FIG. 5 and the prior art relative to a trickle period;

FIG. 8 illustrates a change in a pressure of the separators used in the storage battery of FIG. 5;

DETAILED DESCRIPTION OF THE EMBODIMENTS

Figure 3:
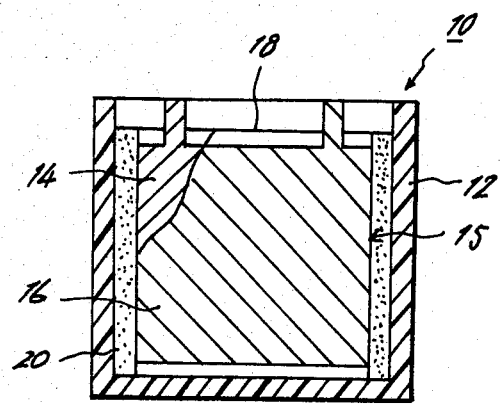
FIG. 3 is a cross sectional view of a sealed lead storage battery constructed in accordance with another embodiment of the invention.

There is shown a sealed lead storage battery 10 constructed in accordance with one embodiment of the invention. The sealed lead storage battery 10 comprises a case 12, positive and negative plates 14 and 16 alternately disposed in the case 12, porous separators 18 of glass fine fiber mat between the adjacent plates 14 and 16 and electrolyte filled in the case so as to be retained in the porous separators 18 and active materials of the plates 14 and 16. The sealed lead storage battery 10 further comprises additional electrolyte porous retainer means 20 disposed in an unoccupied space in the case 12 so as to have an increased amount of electrolyte. In the illustrated embodiment of FIG. 1, the additional electrolyte retainer means 20 comprises a gel layer which is disposed at an upper space over a plate group 15 including the plates 14 and 16 and the porous separators 18.

Thus, it will be noted that an amount of electrolyte increases in comparison with that of the prior art.

FIG. 2 illustrates the result of trickle life test of the sealed lead storage batteries A and B of FIG. 1 and the prior art, respectively. The sealed lead storage batteries of the invention and the prior art were of 6 V and 1.2 Ah type. They were continuously charged with a constant voltage of 6.8 V and at circumference temperature of 45° C. and discharged at a current value of 0.3 A at 20° C. once per month. As noted from FIG. 2, the sealed lead storage battery of FIG. 1 has a trickle life elongated by 1.4 times in comparison with that of the prior art.

Figure 4:
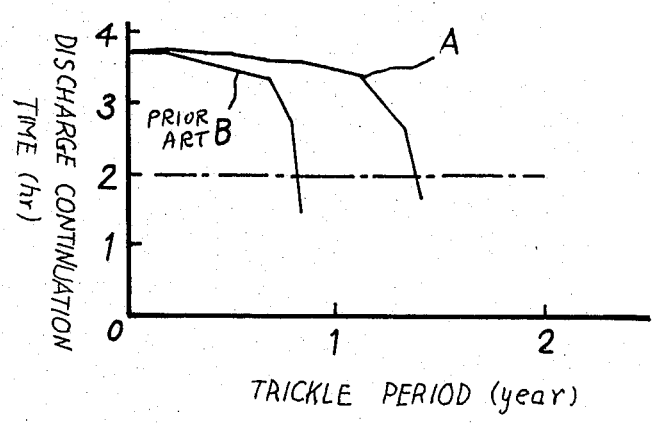
FIG. 4 illustrates a discharge continuation time of the lead storage batteries of FIG. 3 and the prior art relative to a trickle period.
Figure 6B:
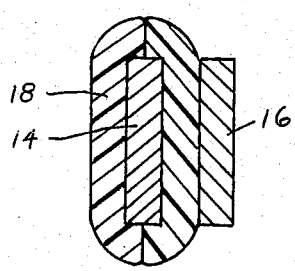

FIG. 3 shows the sealed lead storage battery 10 constructed in accordance with another embodiment of the invention in which the same components are indicated by the same reference numerals. In the embodiment of FIG. 3, the additional electrolyte retainer means 20 comprises glass fine fiber mats in which additional electrolyte is retained and is disposed in side spaces beside the plate group 15. Although, in the illustrated embodiment, the glass fine fiber mats are so disposed as to have their plane directed perpendicualr to the plane of the plate group 15, they may be so disposed as to have their plane located in the same direction as that of the plate group 15. FIG. 4 shows the result of trickle test of the sealed lead storage batteries of FIG. 3 and the prior art. The test conditions were the same as in the trickle test in the embodiment of FIG. 1. As noted from FIG. 4, the storage battery of FIG. 3 had a trickle life lengthened by 1.7 times in comparison with that of the prior art. It should be noted that this is caused by maintenance of closeness of the plates to the electrolyte by expansion and contraction of the additional electrolyte retainer means of glass fine fiber mat in addition to additional electrolyte in the retainer means.

FIG. 5 shows another embodiment of the invention in which the same components are indicated by the same reference numerals. Alloy of collectors of the plates 14 and 16 may preferably have components of Pb-Ca-Sn in order to prevent generation of oxygen and hydrogen as much as possible under charge at constant voltage and provide physical strength thereto. A little amount of Ae, Cu, Zn and Bi may be included in alloy. Also, Ca and Sn should be added to Pb without adversely affecting metal composition of Pb. In one example, the composition of alloy has 98.930% of Pb, 0.065% of Ca and 0.997% of Sn. The total of the three components are 99.992% and Al and Bi may be added thereto.

The separators 18 may be formed of mats of alkali-including glass nonwoven fibers mainly having a thickness of $0.7\mu$. The mats may have a thickness of 1.80 mm. Dilute sulfuric acid to be immersed into the separators to be reteined has a specific gravity of 13.20 and is poured into the case 12 by a buret until it overflows out of the case 12.

In the embodiment of FIG. 5, the additional electrolyte retainer means 20 is integrally formed with the porous separators 18. More particularly, the lower portions 18a of the separators 18 which are positioned near the lower portion of the plate group 15 have a width larger than the inner width of the lower portion of the case 12 while the upper portions 18b of the separators 18 which are positioned near the upper portion of the plate group 15 have a width smaller than the inner width of the upper portion of the case 12. Thus, the lower portions 18a of the separators are so folded as to form a bag to surround the lower portions of the positive plates 14 as shown in FIGS. 2A and 2B. The additional electrolyte retainer means 20 is formed of the folded portions 18a of the separators 18. It will be noted that the separators 18 can be obtained by cutting nonwoven fibers so as to have a width of $(Wl+Wu)/2$ wherein Wl designates the inner width of the lower portion of the case 12 while Wu designates the inner width of the upper portion of the case 12. As noted from FIG. 5, there remains a space at the upper or narrow portion of the case 12. The space forms a passage for gases generated from the plate group 15. Thus, it will be noted that reproduction function of oxygen gases at the negative plates 16 is promoted. Also, since the folded portions 18a of the separators surround the lower portion of the plate group 15 in a bag-like manner, short-circuit due to growth of sponge-like lead and dendritic precipitates at the lower portions of the plates is prevented. The folded portions 18a of the separators also prevent dilute sulfuric acid from flowing in an upward direction. This prevents a person from being damaged.

Hydrogel 22 of sodium sulfate, dilute sulfuric acid and silicon oxide is provided at an upper space of the case 12. A porous member 24 may be disposed on the hydrogel 22 for safely absorbing isolated water. Hydrogel may be preferably poured near the welded portion of the plate group.

FIG. 7 shows the result of trickle test in which the efficiency of the storage battery of FIG. 5 is compared with that of the prior art. In the test, they were continuously charged with a constant voltage of 6.8 V/3 cells at a circumference temperature of 45° C. and the capacities of them were checked at a current value of 0.25A at a temperature of 20° C. once per month. As noted from FIG. 7, the storage battery of FIG. 5 had a life lengthened by approximately 2 times in comparison with that of the prior art.

In order to maintain closeness of the separators to the plates, an initial pressure of 20 kg/d m is preferably applied to the plate group after it is placed into the case. Since the pressure is lowered due to flow of dilute sulfuric acid into the case and variation in thickness of the plates on charge and discharge, a plurality of separators may be preferably used in an overlapped manner.

FIG. 8 shows the result of variation in pressure of the storage batteries, one (C) of which was provided with only one layer separator having a thickness of 1.5 mm and the other (D) was provided with two layer separator having a thickness of 0.8 mm, respectively. In the storage battery (D), the total thickness became 1.5 mm because rough surfaces of the layers are absorbed into each other when they are overlapped one over the other. The pressure was measured by means of a device in which a commercially available pressure conversion gauge was placed between two pressure transferring disks. After the pressure was applied, the measurement began. After 24 hours elapsed, variation in the pressure was measured after pouring sulfuric acid having a specific gravity of 1.280 (20° C.). As noted from FIG. 8, the storage battery (D) had an excellent maintenance of pressure in comparison with the storage battery (C).

FIGS. through 11 show further embodiments of the invention. In these embodiments, the porous separators 18 are disposed so as to surround the lower portions 18a of the positive plates 18 in order to prevent the plate group 15 from being short-circuited. Since this causes the plate group 15 to be positioned at higher level, poles should be shortened so that the conventional case can be used.

Figure 9:
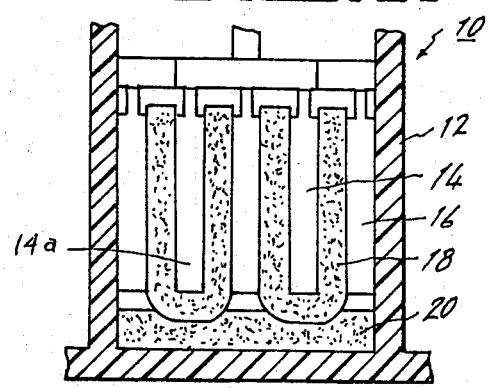
FIG. 9 through 11 are cross sectional views of storage batteries constructed in accordance with further different embodiments of the invention.
Figure 10:
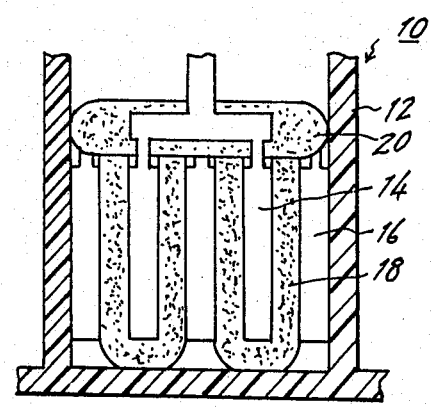
Figure 11:
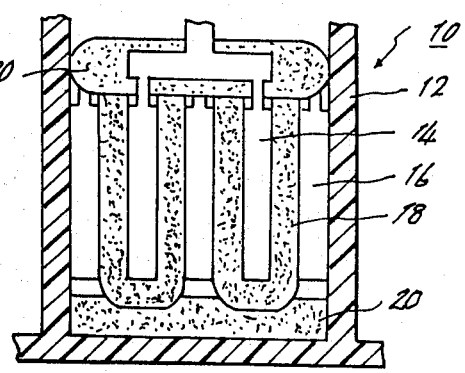

The additional electrolyte retainer means 20 comprises porous sheet member disposed at a lower space below the plate group 15 as shown in FIG. 9, at an upper space over the plate group 15 as shown in FIG. 10, or at upper and lower spaces over and below the plate group 15 as shown in FIG. 11. The porous sheet member may be of same material as that of the separators 18 because it can be inexpensively produced in view of operation in production.

In the embodiments, an absorption function of solution of the porous sheet member is preferably lower than that of the porous separators 18 because acid electrolyte has to rise along the porous separators 18. Thus, the fiber density of the porous sheet member should be preferably lower than that of the porous separators 18.

Figure 12:
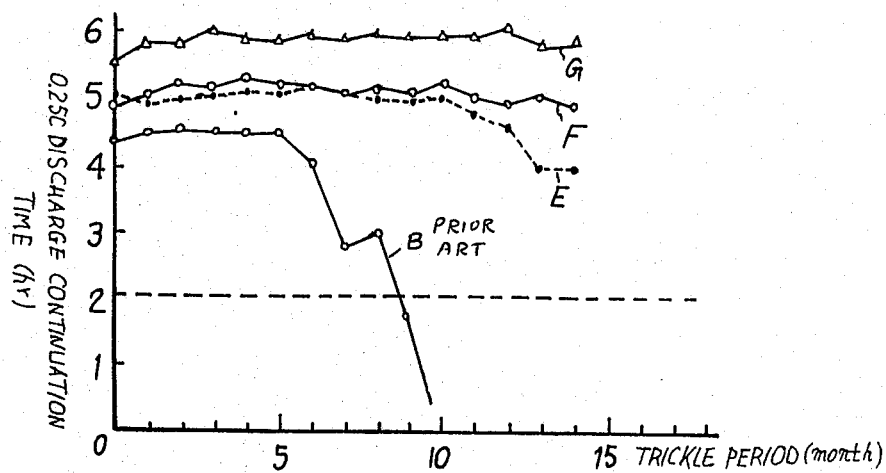
FIG. 12 illustrates a discharge continuation time of the lead storage batteries of FIG. 9 through 11 and the prior art relative to a trickle period.

FIG. 12 shows the result of trickle test of the storage batteries of FIGS. 9 through 11 and the prior art. The test was made by trickle charge at 13.6 V/6 cells at a circumference temperature of 45° C. and by discharge at 0.25 C. at a temperature of 20° C. once per month. The life is considered to be finished at the point of less than 2 hours of continuation time. In FIG. 12, (A) designates the life curve of the prior storage battery while (E), (F) and (G) designate those of the storage batteries of FIGS. 9 through 11, respectively. As noted from FIG. 12, the prior storage battery reached a life in about 9 months, which was caused by decrease in solution while the storage batteries of FIGS. 9 through 11 could have an excellent property in 14 months. This is caused by larger initial capacity f those batteries than that of the prior storage battery by additional electrolyte in the porous sheet member of the additional electrolyte retainer means. This is also caused by the fact that electrolyte of the storage batteries of FIGS. 9 through 11 can be more held than that of the prior art without leaking electrolyte to improve a life and a capacity. Although, in the embodiment of FIG. 9, a space remains between the negative plates 16 and the additional electrolyte retainer means 20, it is not necessary, but it is preferably extinguished by deformation of the porous sheet member into the space or by forcing the plate group into the case 12.

While some preferred embodiments of the invention have been illustrated and described with reference to the accompanying drawings, it will be understood by those skilled in the art that they are by way of example, and that various changes and modifications may be made without departing from the spirit and scope of the invention, which is intended to be defined only to the appended claims.

What is claimed is:

1. A sealed lead storage battery comprising a case, a plate group of positive and negative plates alternately disposed in said case, porous separators between the adjacent plates and electrolyte in said case so as to be retained at least in said porous separators, characterized by said separators being in sheet form and further comprising additional electrolyte porous retainer means disposed in an otherwise unoccupied space in said case other than between said plates so as to have an increased amount of electrolyte and to provide supplemental electrolyte to said separators; said additional electrolyte retainer means comprising unitary portions of said porous separators protruding from said plate group; the lower portions of said separators which are positioned near a lower portion of said plate group having a width greater than the inner width of the lower portion of said case whereas the upper portions of said separators which are positioned near an upper portion of said plate group have a width smaller than the inner width of said upper portion of said case whereby said lower portions of said separators are so folded as to form a bag to surround said lower portions of said positive plates and said additional electrolyte retainer means being formed of said folded portions of said separators.

2. A sealed lead storage battery as set forth in claim 1, wherein said folded portions of said porous separators are in the form of either of U and V shapes.

* * * * *

UNITED STATES PATENT AND TRADEMARK OFFICE
CERTIFICATE OF CORRECTION

PATENT NO. : 4,652,505
DATED : March 24, 1987
INVENTOR(S) : Akio Komaki et al.

Page 1 of 2

It is certified that error appears in the above-identified patent and that said Letters Patent is hereby corrected as shown below:

In Abstract, second paragraph, 4th line, after "have", insert --an--.

Col. 1, line 14, after "at" (first occurence), insert --the--
    line 33, delete "an", insert --the--
    line 34, delete "a", insert --the--
    line 42, delete "a", insert --the--
    line 43, after "the" (second occurence), insert --electrolyte--
    line 44, "poorly" should be --not--
    line 53, "sulfic" should be --sulfuric--
    line 66, "threrto" should be --thereto--

Col. 2, line 1, "poorly" should be --not--
    line 1, after "close to", insert --the electrolyte--
    line 5, delete "a", insert --the--
    line 42, delete "of", insert --applied to--

Col. 3, line 8, delete "circumference"
    line 43, delete "little", insert --small--
    line 44, delete "Ae", insert --Al--
    line 44, after "in", insert --the--
    line 54, "reteined" should be --retained--
    line 54, "13.20" should be --1.320--

UNITED STATES PATENT AND TRADEMARK OFFICE
CERTIFICATE OF CORRECTION

PATENT NO. : 4,652,505

DATED : March 24, 1987

Page 2 of 2

INVENTOR(S) : Akio Komaki et al.

It is certified that error appears in the above-identified patent and that said Letters Patent is hereby corrected as shown below:

Col. 4, line 1, "2A and 2B" should be --6A and 6B--
line 38, "kg/d m" should be --$kg/cm^2$--
line 48, before "having", insert --each--
line 63, "18a" should be --14a--
line 64, "18" should be --14--
line 66, after "at", insert --a--
line 61, after "Figs" insert -- 9 --.
Col. 5, line 7, after "of" (first occurence), insert --the--
line 22, after "of" insert --discharge--
line 22, delete "(A)" insert --(B)--
line 26, delete "a", insert --the end of--
lines 28 & 29, delete "could have" and insert --still had--
line 29, delete "property in" and insert --discharge capacity after--
line 30, after "initial" insert --ampere hour--
line 30, delete "f" and insert --of--
line 33, before "electrolyte" insert --more--
lines 34 & 35, delete "can be more held"
line 36, delete "a" (first occurence)
line 36, delete "a" (second occurrence) and insert --ampere hour--.

Signed and Sealed this

Nineteenth Day of January, 1988

Attest:

DONALD J. QUIGG

Attesting Officer

Commissioner of Patents and Trademarks